United States Patent
Petersen

(10) Patent No.: US 6,433,537 B1
(45) Date of Patent: Aug. 13, 2002

(54) ARRANGEMENT FOR MEASURING A RELATIVE LINEAR POSITION BETWEEN AN ANGLE SENSOR AND MAGNETIC BODY

(75) Inventor: August Petersen, Henstedt-Ulzburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/421,648

(22) Filed: Oct. 20, 1999

(30) Foreign Application Priority Data

Oct. 28, 1998 (DE) .......................... 198 49 613

(51) Int. Cl.⁷ .................................. G01B 7/14
(52) U.S. Cl. ...................... 324/207.24; 324/207.22; 324/207.21
(58) Field of Search ................. 324/207.21, 207.24, 324/207.25, 235, 207.22; 338/32 R

(56) References Cited

U.S. PATENT DOCUMENTS 5,122,750 A * 6/1992 Rippingale et al. .... 324/207.22
6,163,147 A * 12/2000 Peilloud ................ 324/207.22

FOREIGN PATENT DOCUMENTS

| DE | 4233331 A1 | 4/1994 |
| DE | 19640695 A | 4/1998 |
| JP | 02306113 | 3/1991 |

* cited by examiner

Primary Examiner—Walter E. Snow

(57) ABSTRACT

An arrangement for measuring a relative linear position between a sensor and a magnetic body, whose position relative to each other can be changed linearly in a predefined direction. The sensor is arranged as a magnetoresistive angle sensor, with little building expenditure and little sensitivity to external influences, and a magnetic strip is provided as the magnetic body, which strip includes a pair of magnetic poles and magnetic field lines running over its length at varying angles, so that the angle of the magnetic field penetrating the magnetoresistive angle sensor depends on the relative position of the magnetoresistive angle sensor to the magnetic strip and the relative position can be computed from the output signal of the magnetoresistive angle sensor.

5 Claims, 2 Drawing Sheets

ARRANGEMENT FOR MEASURING A RELATIVE LINEAR POSITION BETWEEN AN ANGLE SENSOR AND MAGNETIC BODY

BACKGROUND OF THE INVENTION

The invention relates to an arrangement for measuring a relative linear position between a sensor and a magnetic body, whose position relative to each other can be changed linearly in a predefined direction.

Such an arrangement is known from DE-OS 42 33 331. The arrangement disclosed there includes a sensor with two sensor elements whose signals are evaluated by means of measuring bridges. The relative linear position can be determined to a magnetic body that has a periodic multi-pole structure. The sensors measure in a unidimensional manner i.e. they measure in a certain measuring direction the strength of the occurring magnetic field. When there is a change of position, the sensor detects the number of the magnetic poles from the signal of one measuring element, the direction of movement from the signals of the two measuring elements and, in addition, the analog position within the range of one magnetic pole from the signals of the two measuring elements. The arrangement can process a sine/cosine signal from the two sensors only when there is a really optimum match between sensor and encoder. Inaccuracies of the magnetic field, i.e. deviations from the ideal sine shape which generally occur in practice, phase errors and magnetization errors of the magnetic structure, and different sensitivities of the two sensor elements have a considerable influence on the result produced by the arrangement. Thus, the arrangement produces the desired result only under ideal conditions, which can hardly be achieved in practice, which desired result is the exact indication of the linear position between sensor and magnetic body.

SUMMARY OF THE INVENTION

It is an object of the invention to further develop the arrangement defined in the opening paragraph in that it produces the best possible, that is, most accurate, result of the linear position at little expenditure and in that it is highly independent of the variations of field strength and temperature and distance tolerances.

This object is achieved according to the invention in that the sensor is arranged as a magnetoresistive angle sensor and in that a magnetic strip is arranged as the magnetic body, which strip has a pair of magnetic poles and magnetic field lines running over its length at varying angles, so that the angle of the magnetic field penetrating the magnetoresistive angle sensor depends on the relative position of the magnetoresistive angle sensor to the magnetic strip and the relative position can be computed from the output signal of the magnetoresistive angle sensor.

The magnetoresistive angle sensor exclusively works as an angle sensor, that is, the resistance of at least one sensor element in the sensor changes with the direction of the magnetic field running through the sensor. The magnetoresistive angle sensor is therefore insensitive to variations of the field strength of the magnetic field running through it. This again leads to the fact that the measuring result is independent of the strength of the magnetic field of the magnetic body, of the distance between sensor and magnetic body and independent of the temperature. The magnetic strip relative to which the position of the sensor can be determined, includes a pair of magnetic poles. The magnetization over the length of the magnetic strip is then provided such that the magnetic field lines viewed over the length of the magnetic strip show varying angles. In consequence, the relative position of the sensor to the magnetic body can be computed from the angle of the field lines passing through the sensor.

As a result of an angle measurement that is relatively insensitive to disturbances caused by external influences and variations of the magnetic field strength, this simple-structure arrangement provides a really accurate relative linear position between sensor and magnetic body. It is not necessary for the arrangement, as it is for many state-of-the-art arrangements, to have a supporting magnet for calibrating the sensor. Furthermore, since the magnetoresistive angle sensor measures only angles and not field strengths, the arrangement is insensitive to external influences, which often occur under special mounting conditions, for example, in vehicles.

In accordance with an embodiment of the invention, the magnetic strip is advantageously arranged as a flat strip in which the magnetoresistive angle sensor is positioned on a longitudinal side of the magnetic strip, so that the field strength running through it is maximum and the sensor measures only angles and not field strengths.

Advantageously, the magnetoresistive angle sensor as arranged in a further embodiment has two sensor elements, which are concentric to each other and turned through 45° to each other. This achieves the advantage that an angle range of ±90° of the magnetic field can be measured and, in addition, this range can be reached with a high resolution and accuracy. This provides that the measuring range of the arrangement can be expanded to relatively large mechanical ranges, for example, to a measuring range of 100 mm.

Advantageously, known evaluation circuits for magnetoresistive angle sensors can be used for the arrangement, which evaluation circuits, as is provided in accordance with a further embodiment may be arranged as integrated circuits which use the CORDIC algorithm as a simple method for computing an angle.

It may perhaps be desirable, depending on the purpose of use, to measure the linear position not with constant accuracy over the entire measuring range, but to achieve an increased accuracy of the measurement of the linear position in certain areas. For this purpose, as provided in an additional embodiment, the characteristic curve of the magnetic field over the length of the magnetic strip has a non-linear pattern. This means that in some areas the change of angle of the magnetic field per unit of length of the magnetic strip shows a stronger variation than in other areas. Thus, in the areas in which the change of angle of the magnetic field per unit of length of the magnetic strip shows a stronger variation, an increased measuring accuracy can be achieved.

DETAILED DESCRIPTION OF THE INVENTION

These and other aspects of the invention are apparent from and will be elucidated in greater detail with reference to the embodiments described hereinafter.

Figure 1A:
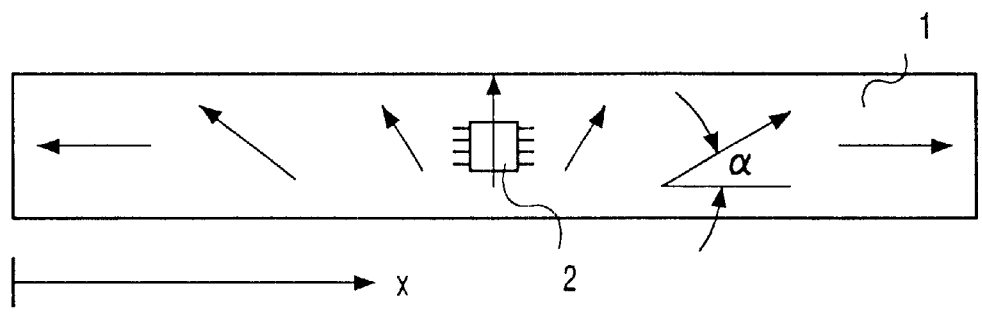
FIG. 1a and FIG. 1b show two elevations of an example of embodiment of the invention with a magnetoresistive eagle sensor and a magnetic strip.

FIG. 1A shows a plan view of a magnetic strip 1 in a diagrammatic manner, which strip is magnetized with a magnetic field that has a pair of magnetic poles. The field lines of the magnetic field, seen over the longitudinal reach of the magnetic strip 1, run at varying angles. In the Figure an angle α is indicated for a field line. This angle a between the running direction of the field line and the direction of the longitudinal reach of the magnetic strip 1 is different for each of the field lines considered over the longitudinal reach of the magnetic strip 1.

FIG. 1A further contains a magnetoresistive angle sensor denoted 2 which, although it is situated underneath the magnetic strip 1, is nevertheless shown in the Figure to clarify the position.

The magnetoresistive angle sensor 2 works in its saturation range i.e. the measuring signal of the magnetoresistive angle sensor 2 exclusively depends on the angle of the magnetic field running through it, but not on its field strength. Furthermore, it is largely independent of temperature variations as long as the field direction does not change.

Advantageously, the magnetoresistive angle sensor 2 is provided with two concentrically arranged sensor elements which are mutually staggered by 45°. As a function of the field angle, such MR sensors then generate two signals mutually phase shifted by 90°. The ratio between these two signals provides the angle or position respectively, in the arrangement according to the invention. The signal level depending on distance and temperature has no influence as a result of this ratio. The sensor KMZ manufactured by Philips, which has two MR full bridges, is an example of such sensors.

The relative position between the magnetic strip 1 and the magnetoresistive sensor 2 can be changed linearly in the x-direction shown in the Figure and is to be measured.

Figure 1B:
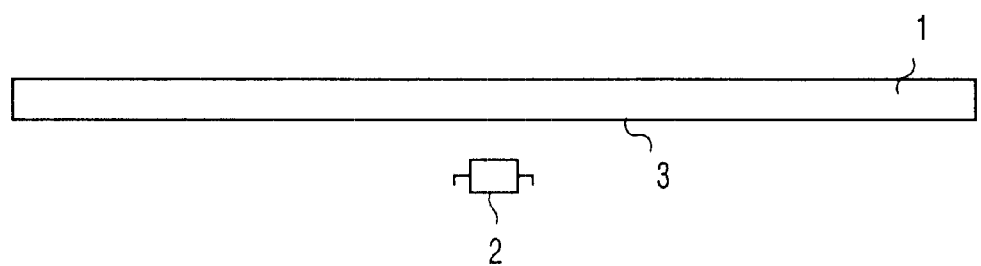

FIG. 1B shows the arrangement as shown in FIG. 1A in side elevation, from which may be seen that the magnetic strip 1 has a relatively flat structure and the magnetoresistive angle sensor 2 is arranged underneath the magnetic strip 1. The magnetoresistive angle sensor 2 is thus positioned opposite the underside 3 of the magnetic strip 1.

As a result of the above properties of the magnetoresistive angle sensor, the distance between the magnetoresistive angle sensor 2 and the underside 3 of the magnetic strip plays only a minor role for the measuring result. For many applications this is advantageous, because the distance between the magnetoresistive angle sensor 2 and the magnetic strip 1 may vary between boundaries and depend on the arrangement.

In the representation shown in FIG. 1A, the magnetic field line of the magnetic strip runs at an angle α=90° through the magnetoresistive sensor 2. For the reasons described above, the field strength and also temperature influences hardly play any role, so that the measuring result is unaffected by external influences.

Figure 2:
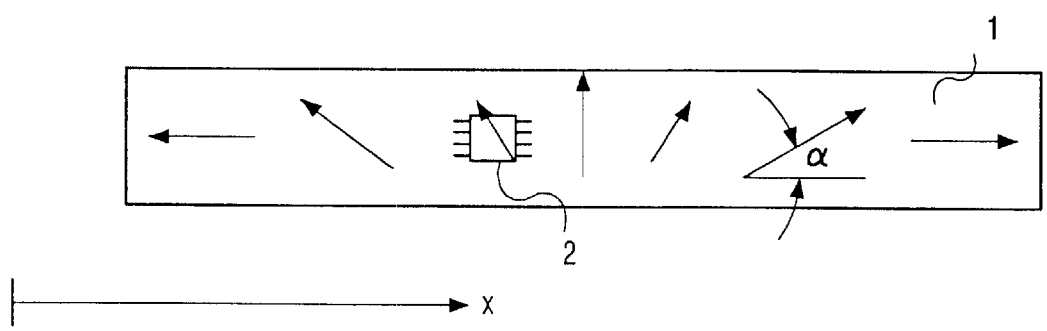
FIG. 2 shows an elevation of the example of embodiment as shown in FIG. 1 with a varying relative linear position between sensor and strip.

FIG. 2 shows the arrangement shown in FIG. 1 with another position of the magnetic strip 1. The magnetic strip 1 has been linearly moved in the x-direction relative to the position shown in FIG. 1A by a certain distance. Thus the relative linear position between magnetoresistive angle sensor 2 and magnetic strip 1 has changed.

The diagrammatic representation shown in FIG. 2 indicates that as a result of the change of the relative linear position of these elements to each other, also the angle α of the field line of the magnetic field running through the magnetoresistive angle sensor 2 has changed. In the example shown in FIG. 2 this angle a is now about 130°.

From the measuring signal produced by the magnetoresistive angle sensor 2, which signal relates to the change of angle, determined the relative position between magnetoresistive angle sensor 2 and the magnetic strip 1, can immediately be determined because the angle distribution of the field lines over the length of the magnetic strip is known. From the angle of the field lines of the magnetic field which runs through the magnetoresistive sensor 2 thus the relative position between magnetoresistive sensor 2, and magnetic strip 1 may be inferred.

In consequence, the arrangement is in a position to determine the relative linear position in x-direction between the magnetoresistive angle sensor 2 and the magnetic strip 1. The arrangement has a relatively simple structure and is nevertheless insensitive to external influences.

The evaluation of the measuring signals produced by the magnetoresistive sensor 2 may be performed, for example, by known integrated circuits such as, for example, type UZZ 9000 manufactured by Philips. These integrated circuits perform an evaluation of the signal and produce a result that directly gives the angle of the magnetic field running through the sensor. These circuits use the CORDIC algorithm for computing the angle, which algorithm provides a really good approximation of the actual angle and enables a relatively simple computation of the angle.

What is claimed is:

1. An arrangement for measuring a relative linear position between a sensor (2) and a magnetic body (1), whose position relative to each other can be changed linearly in a predefined direction, characterized in that the sensor (2) is a magnetoresistive angle sensor which measures only angles and in that a magnetic strip (1) is arranged as the magnetic body, which strip has a pair of magnetic poles and magnetic field lines running over its length at varying angles, so that the angle of the magnetic field penetrating the magnetoresistive angle sensor (2) depends on the relative position of the magnetoresistive angle sensor (2) to the magnetic strip (1) and the relative position can be computed from the output signal of the magnetoresistive angle sensor (2).

2. An arrangement as claimed in claim 1, characterized in that the magnetoresistive angle sensor (2) is positioned opposite a flat longitudinal side (3) of the magnetic strip (1).

3. An arrangement as claimed in claim 1, characterized in that the magnetoresistive angle sensor (2) has two sensor elements arranged concentrically to each other at an angle of 45 degrees.

4. An arrangement as claimed in claim 3, characterized in that the signals of the two sensor elements are evaluated in an integrated circuit in which the CORDIC algorithm is used for computing the angle.

5. An arrangement as claimed in claim 1, characterized in that the characteristic curve of the field line direction of the magnetization of the magnetic strip (1) is non-linear over its longitudinal reach.

* * * * *